(No Model.)
J. A. CROW.
Cotton Seed Planter.
No. 239,651.    Patented April 5, 1881.
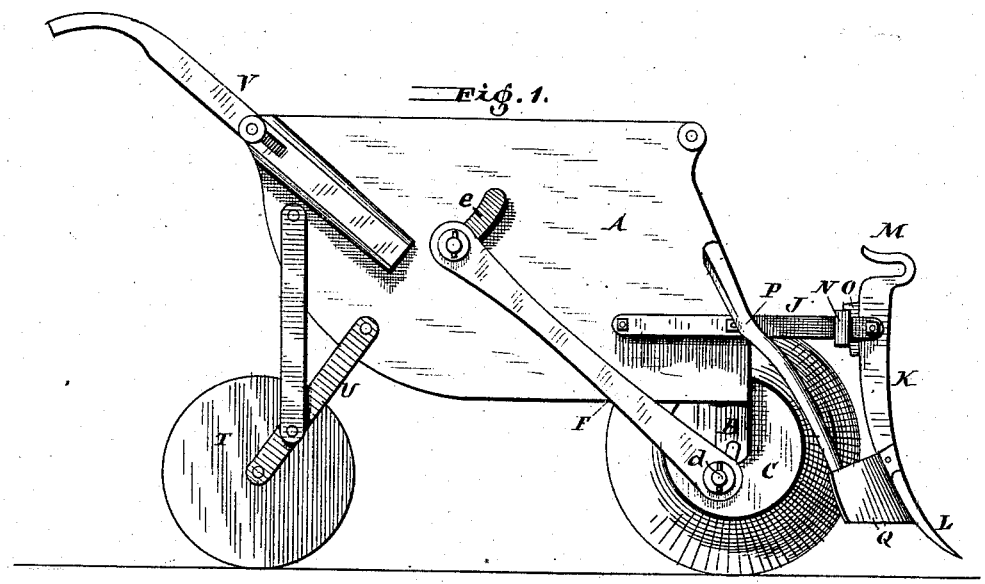
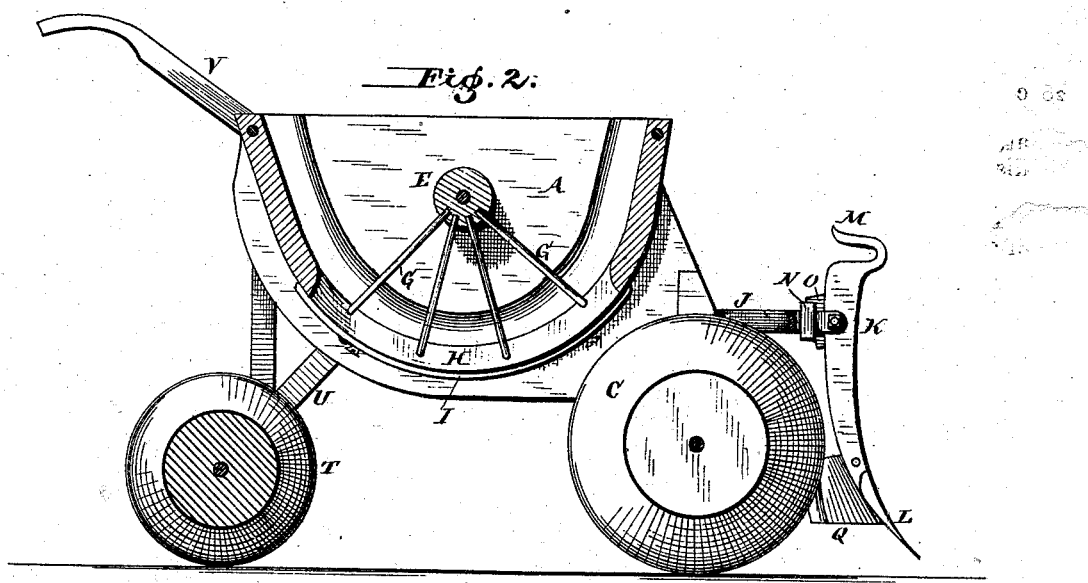
Witnesses:
A. M. Long
A. Mc. Tanner
John Alexander Crow, Inventor.
By Paine, Grafton & Ladd,
Attorneys.

UNITED STATES PATENT OFFICE.

JOHN A. CROW, OF HUGHES SPRINGS, TEXAS.

COTTON-SEED PLANTER.

SPECIFICATION forming part of Letters Patent No. 239,651, dated April 5, 1881.

Application filed January 7, 1881. (No model.)

*To all whom it may concern:*

Be it known that I, JOHN ALEXANDER CROW, a citizen of the United States, residing at Hughes Springs, in the county of Cass and State of Texas, have invented certain new and useful Improvements in Cotton-Seed Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is to furnish a cotton-seed planter which shall be simple in construction and effective in operation.

The invention consists in the combination of a front pair of scraping-wings attached to a central furrow-opener, a revolving biconical wheel for pressing open the furrow and operating a toothed or spiked seed stirring and distributing shaft, and a rear covering-roller having a concave periphery.

In the drawings, Figure 1 is a side elevation of a cotton-seed planter constructed according to my invention. Fig. 2 is a longitudinal sectional view thereof.

The frame-work and hopper A is constructed of two side plates or boards, having a curved board or plate secured between the same by means of transverse bolts, for forming the bottom and ends of the hopper. The side boards extend beyond said hopper-bottom, and have metallic plates or hangers B secured to the inner sides of their front ends. These plates project below the side boards and serve to receive the journals of a ground-roller, C. This roller is of a biconical form, or is provided with a sharp or angular periphery. One of the journals thereof is extended and bent into a crank-arm, d, which is connected with a similar crank-arm, e, of a transverse rocking or oscillating shaft, E, by means of a pitman, F. The shaft E is journaled in the sides of the hopper, and carries a series of fingers, G, which work in a curved slot, H, formed in the bottom of the hopper for the purpose of expelling or forcing the seed through said slot.

The discharge of the seed is regulated by means of plates I, attached to the under side of the hopper-bottom, and made adjustable to and from each other by means of slats and screws, so as to vary the size of the discharge-slot left between said plates.

Two metallic bars, J, are bolted to the side boards, A, and bent toward each other, so as to have their front ends meet, and between these ends a metallic standard, K, is secured by a transverse bolt. The standard K is curved forward, and has its lower end formed into or provided with a plow-point, L, and its upper end is formed into a rearwardly-extending hook, M. A clip, N, and wedge O, applied to the adjoining ends of the two beams or bars J, serve as additional means for holding the beams together and the plow and draft standard in proper position.

The standards P are secured to the side boards, A, and extend in a forward and outward direction, and have outer ends of two wings or scraper-blades, Q, attached thereto, the inner ends of said wings being secured to the standard K by flanges and rivets or other fastening devices. The object of these wings is to scrape or bar off the sides of the cotton-ridge; and the plow-point, which is located immediately in front of the biconical roller, opens the furrow to a sufficient depth. The roller C follows and presses the furrow open, so as to leave the same in the shape of the letter V, after which the seed is properly dropped into the furrow by means of the fingered agitating and distributing shaft. A roller, T, located in rear of the hopper and journaled in arms U extending therefrom, is made as wide as the entire hopper or frame-work, and serves to cover the seed and to raise a ridge or hill over the same. This result is effected by making said roller with a concave periphery, as is clearly shown. Suitable handles, V, serve for the guidance of the planter. The draft is applied to the hook-shaped upper end of the standard of the furrow-opener.

I do not wish to claim the various parts of my planter, separately considered, as I am aware they have been employed in many instances; but I restrict myself to the particular combination and construction of parts herein shown, whereby I am enabled to achieve better results than with planters heretofore constructed.

What I claim as my invention, and desire to secure by Letters Patent, is—

In a cotton-seed planter, the combination of the front pair of wing-scrapers, the central furrow-opener, the biconical ground-roller for pressing the furrow open, the apertured hopper containing fingered distributing-shaft, and the rear covering-roller having concave periphery, all constructed and relatively arranged as herein set forth, for the purpose specified.

In testimony whereof I affix my signature in presence of two witnesses.

JOHN A. CROW.

Witnesses:
J. F. JONES,
A. M. SHELTON.